(12) United States Patent
Dede et al.

(10) Patent No.: US 10,692,302 B2
(45) Date of Patent: Jun. 23, 2020

(54) SERVICING SCHEDULE METHOD BASED ON PREDICTION OF DEGRADATION IN ELECTRIFIED VEHICLES

(71) Applicant: TOYOTA MOTOR ENGINEERING & MANUFACTURING NORTH AMERICA, INC., Erlanger, KY (US)

(72) Inventors: Ercan M. Dede, Ann Arbor, MI (US); Shailesh N. Joshi, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 40 days.

(21) Appl. No.: 15/661,556

(22) Filed: Jul. 27, 2017

(65) Prior Publication Data

US 2019/0035170 A1 Jan. 31, 2019

(51) Int. Cl.
*G07C 5/00* (2006.01)
*G06Q 10/10* (2012.01)
*G07C 5/08* (2006.01)

(52) U.S. Cl.
CPC ......... *G07C 5/006* (2013.01); *G06Q 10/1095* (2013.01); *G07C 5/008* (2013.01); *G07C 5/0808* (2013.01)

(58) Field of Classification Search
USPC ....................................................... 701/29.4
See application file for complete search history.

(56) References Cited

U.S. PATENT DOCUMENTS

| | | | |
|---|---|---|---|
| 5,737,215 A | 4/1998 | Schricker et al. | |
| 7,103,460 B1 * | 9/2006 | Breed | B60C 23/0408 |
| | | | 701/29.1 |
| 8,204,702 B2 | 6/2012 | Center | |
| 9,238,410 B2 | 1/2016 | Nakagawa | |
| 9,286,735 B1 | 3/2016 | Ahn et al. | |
| 9,493,074 B2 | 11/2016 | Reese et al. | |

(Continued)

OTHER PUBLICATIONS

Gosnell, M., et al., "Exploring the Mahalanobis-Taguchi Approach to Extract Vehicle Prognostics and Diagnostics", IEEE, 8 Pages total, (2014).

(Continued)

*Primary Examiner* — Tyler D Paige
(74) *Attorney, Agent, or Firm* — Oblon, McClelland, Maier & Neustadt, L.L.P.

(57) ABSTRACT

A method includes collecting, via processing circuitry, a first set of multi-load data from a power control unit of a vehicle and usage data at a first servicing of the vehicle, computing, via the processing circuitry, a Mahalanobis Distance (MD) using the first set of multi-load data, defining, via the processing circuitry, a healthy state and an anomaly threshold based on the MD, correlating, via the processing circuitry, the first set of usage data to the anomaly threshold; generating, via the processing circuitry, a usage based servicing schedule for a vehicle; collecting, via the processing circuitry, a next set of multi-load data and usage data at a next servicing of the vehicle; updating, via the processing circuitry, the MD, a servicing schedule and evaluating the performance of the vehicle; determining, via the processing circuitry, whether the MD crosses the anomaly threshold; and transmitting, via a network, a servicing alert.

16 Claims, 5 Drawing Sheets

(56) References Cited

U.S. PATENT DOCUMENTS

| | | |
|---|---|---|
| 2006/0149519 A1* | 7/2006 | Keller .................. G07C 5/0808 |
| | | 703/8 |
| 2006/0224283 A1* | 10/2006 | Fussey .................... F02D 41/22 |
| | | 701/31.4 |
| 2007/0028220 A1 | 2/2007 | Miller et al. |
| 2011/0130916 A1 | 6/2011 | Mayer |
| 2012/0068666 A1* | 3/2012 | Abe ...................... H02J 7/0075 |
| | | 320/128 |
| 2013/0013138 A1* | 1/2013 | Lu ......................... B60L 3/0061 |
| | | 701/22 |
| 2013/0226395 A1* | 8/2013 | Bense ................. F16K 37/0083 |
| | | 701/32.9 |
| 2016/0012651 A1 | 1/2016 | Mouterde |
| 2018/0101775 A1* | 4/2018 | Fish ....................... G06Q 10/04 |

OTHER PUBLICATIONS

Jobi-Taiwo, A.A., et al., "Predicting Faults in Heavy Duty Vehicles Using the Mahalanobis-Taguchi Strategy", IIE Annual Conference Proceedings, 9 Pages total, (Jan. 1, 2013).
Patil, N., et al., "Anomaly Detection for IGBTs using Mahalanobis Distance", Microelectronics Reliability, 6 Pages total, (2015).

\* cited by examiner

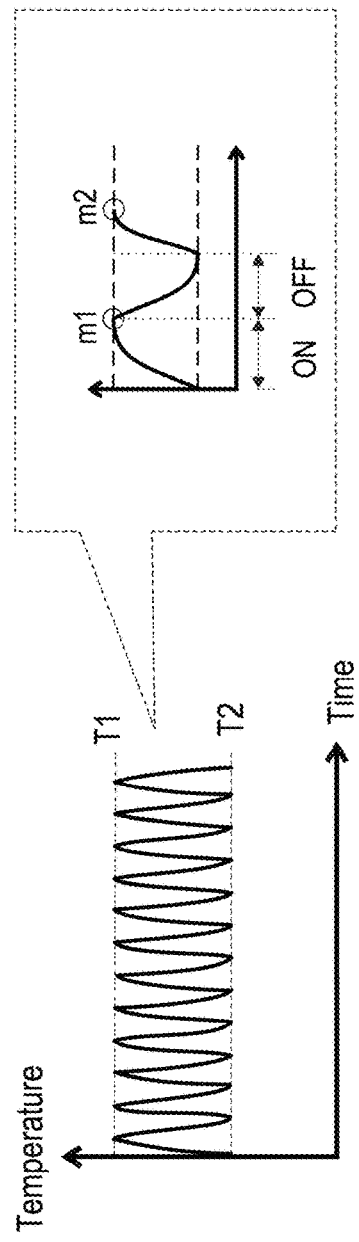
FIG. 3A
FIG. 3B
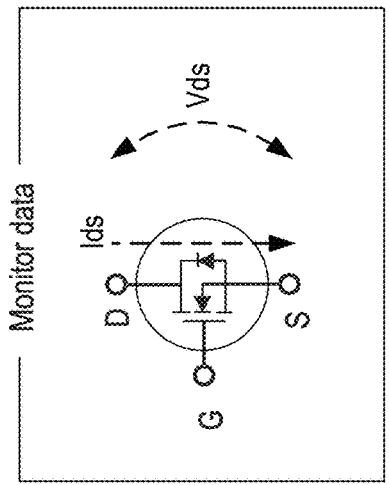
FIG. 3D
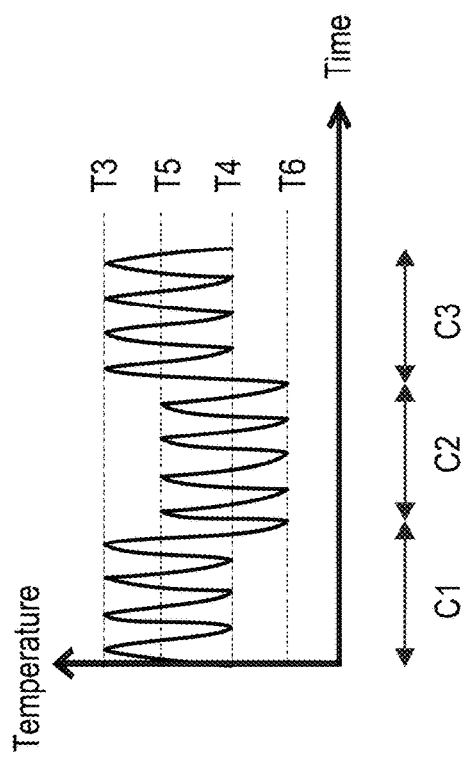
FIG. 3C

SERVICING SCHEDULE METHOD BASED ON PREDICTION OF DEGRADATION IN ELECTRIFIED VEHICLES

BACKGROUND

Field of the Disclosure

This application relates generally to improvements in maintenance or servicing of an electric or hybrid vehicle. More particularly, this application relates to improvements related to degradation prediction of the electric or hybrid vehicle and determining an anticipatory servicing schedule.

Description of the Related Art

A typical electric or hybrid vehicle includes a power control unit (PCU) that includes several parts such as an AC/DC converter, a Voltage-Boosting Converter, an inverter, power module, capacitor, inductor, etc. Existing methods for anomaly detection of PCU include utilizing voltage and current measurements as inputs to an algorithm that computes a Malhalanobis distance (MD), which is a probabilistic method to define the threshold for anomaly detection based on the healthy behavior of a device.

The typical MD approach reduces multivariate data to univariate data. MD is sensitive to changes between various parameters monitored as computation of MD includes the correlation between the different parameters.

SUMMARY

According to an embodiment of the present disclosure, there is provided a method for a servicing schedule of a vehicle. The method includes collecting, via processing circuitry, a first set of multi-load data from a power control unit of a vehicle and usage data at a first servicing of the vehicle, computing, via the processing circuitry, a Mahalanobis Distance (MD) using the first set of multi-load data, defining, via the processing circuitry, a healthy state and an anomaly threshold based on the MD, correlating, via the processing circuitry, the first set of usage data to the anomaly threshold; generating, via the processing circuitry, a usage based servicing schedule for a vehicle; collecting, via the processing circuitry, a next set of multi-load data and usage data at a next servicing of the vehicle; updating, via the processing circuitry, the MD, a servicing schedule and evaluating the performance of the vehicle; determining, via the processing circuitry, whether the MD crosses the anomaly threshold; and transmitting, via a network, a servicing alert.

According to an embodiment of the present disclosure, there is provided a system for servicing schedule of an electrified vehicle. The system includes one or more vehicle including an electric vehicle or a hybrid vehicle, one or more service stations where the one or more vehicle is serviced, and processing circuitry. The processing circuitry is configured to collect a first set of multi-load data from a power control unit of the one or more vehicle and usage data brought in for a first servicing at the one or more service stations, compute a Mahalanobis Distance (MD) using the first set of multi-load data, define a healthy state and an anomaly threshold based on the MD, correlate the first set of usage data to the anomaly threshold, generate a usage based servicing schedule for the one or more vehicles serviced at the one or more service stations, collect a next set of multi-load data and usage data at a next servicing of the one or more vehicles, update the MD, a servicing schedule and evaluating the performance of the one or more vehicles, determine whether the MD crosses the anomaly threshold, and transmit, via a network, a servicing alert upon exceeding the anomaly threshold to the one or more vehicles.

According to an embodiment of the present disclosure, there is provided a non-transitory computer-readable medium storing instructions which when executed by a computer, cause the computer to perform a method for generating a servicing schedule of a vehicle, discussed above.

The forgoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein:

FIGS. 3A and 3B illustrate a single load power cycle and a power ON-OFF timing within the cycle, respectively, according to an embodiment of the present disclosure;

FIG. 3C illustrates a multi-load power cycle according to an embodiment of the present disclosure;

FIG. 3D is a schematic of an electronic component according to an embodiment of the present disclosure;

DETAILED DESCRIPTION

Figure 1:
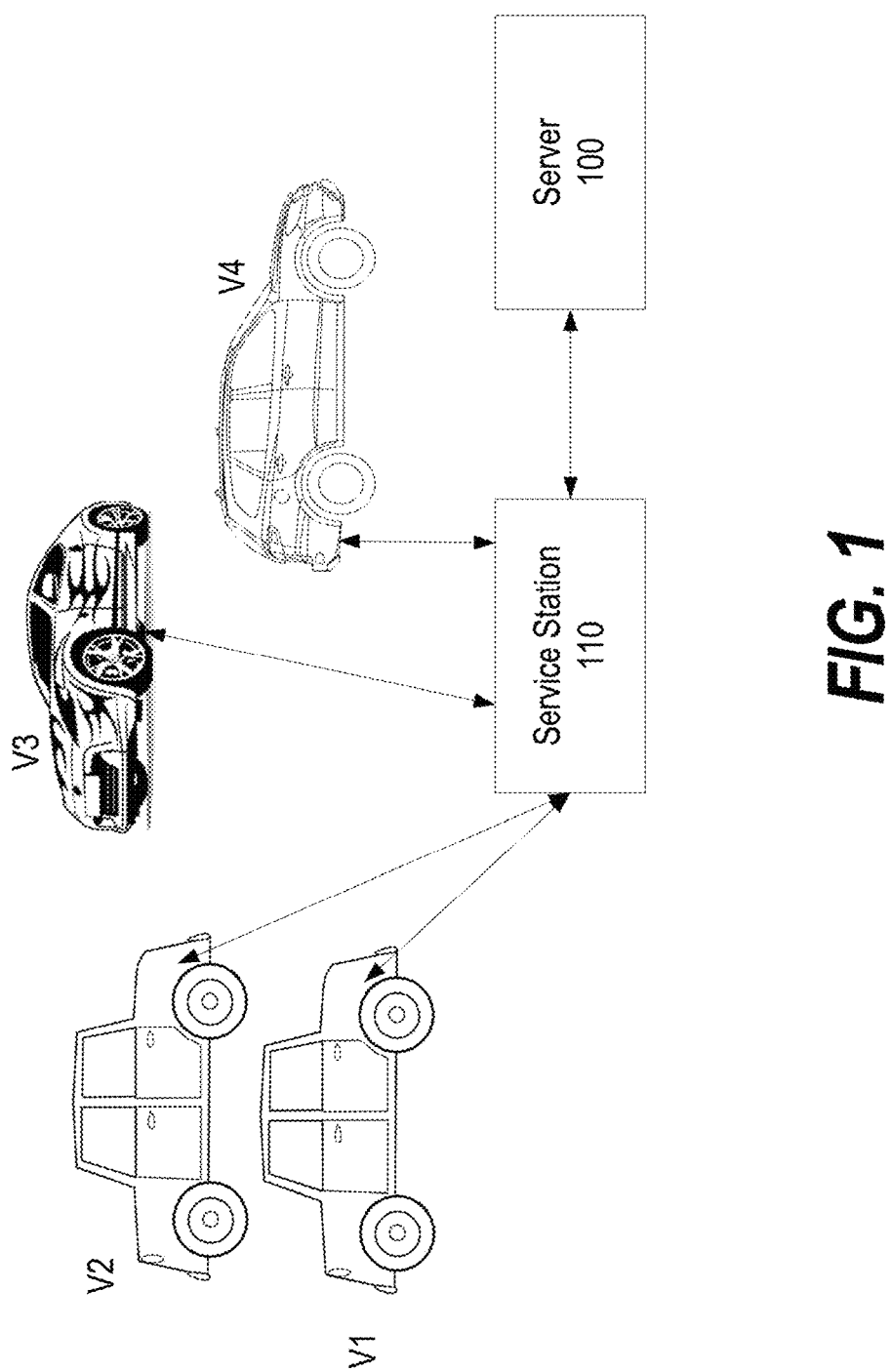
FIG. 1 is a block diagram of a vehicle servicing system according to an embodiment of the present disclosure.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

A servicing schedule (also referred to as service model) for collection of data from field deployed electrified vehicles is explained, where multi-load data is inputted to a probabilistic method for anomaly detection. A statistical distribution of normal usage of a vehicle is further obtained from which a healthy state is better defined along with a degradation based on field variations. Anticipatory servicing may be autonomously scheduled based on the method.

FIG. 1 is a block diagram of a vehicle servicing system according to an embodiment of the present disclosure. The vehicle servicing system includes a service station 110 that communicates with a server 100. The service station 110 can be any service station or a garage where a vehicle can be brought in for servicing, repair or regular maintenance. The service station 110 refers to one or more service stations that can be located in geographically diverse locations.

The vehicles V1, V2, V3, V4, . . . , Vn can be any hybrid or electric vehicles that are serviced at the service station 110. The servicing of the vehicle can be a first, second, third, etc. scheduled or unscheduled maintenance. The scheduled maintenance can be measured in distance travelled by the vehicle or duration of time. For example, the first scheduled maintenance of a vehicle V1 can be when the vehicle V1 is driven between 0-5000 miles or after 6 months from the purchase of the vehicle V1, the second scheduled maintenance can be between 5000 and 1000 miles, and so on.

The server 100 refers to processing circuitry configured to receive and process data from the power control unit (PCU) of the vehicle serviced at the service station 110. The PCU data comprises a multi-load data and usage data. The multi-load data represent a set of values corresponding to more than one parameters, for example, temperature, power, vibration, current, or voltage from a plurality of sensors. Usage data characterizes a usage of the vehicle based on parameters such as a frequency of use, mileage, geographic location, environment, normal or abnormal wear, etc.

The server 100 is further configured to compute a Mahalanobis Distance (MD) using the multi-load data, and establish a healthy state of a vehicle based on a first set of multi-load data corresponding to the first servicing of the vehicle. In one example, FIGS. 3A and 3C illustrate a single load and multi-load input data, respectively, that can be used during testing of a PCU of a vehicle. In FIG. 3A, for single load, the device temperature varies uniformly within the temperatures T1 and T2, for example, the device temperature can be in a range 175° C.±5° C. and 65° C.±2° C. Referring to FIG. 3B, temperature measurements (e.g. m1 and m2) can be collected at the end of the ON cycle of the power cycle. In FIG. 3C, for a multi-load condition, the device temperature can vary non-uniformly. For example, the device temperature varies between T3 and T4 for a first cycle C1, between T4 and T5 for a second cycle C2 and between T3 and T4 for a third cycle C3. In one example, the temperature range T3-T4 can be between 150° C.±5° C. and 65° C.±2° C., and the temperature range T5-T6 can be between 110° C.±5° C. and 25° C.±2° C. The device temperature affects a current Ids and a voltage Vds between the drain and source, as illustrated in FIG. 3D. The current Ids and the voltage Vds are the output of PCU that can be further used to define the Mahalanobis Distance (MD). While temperature data is utilized in this specific example, other data, such as vibration data, may be utilized in the process flow, and hence this example should thus be considered non-limiting.

Based on the Mahalanobis Distance (MD), the server 100 is configured to predict degradation of components, and determine a servicing schedule before such degradation occurs. Furthermore, the multi-load data can be correlated to the usage data to more accurately define the healthy state of the vehicle and predicting component degradation. The server 100 implements the degradation prediction method 100 described in FIGS. 2A and 2B. The hardware elements of an example server 100 are discussed with respect to FIG. 5.

Figure 2:
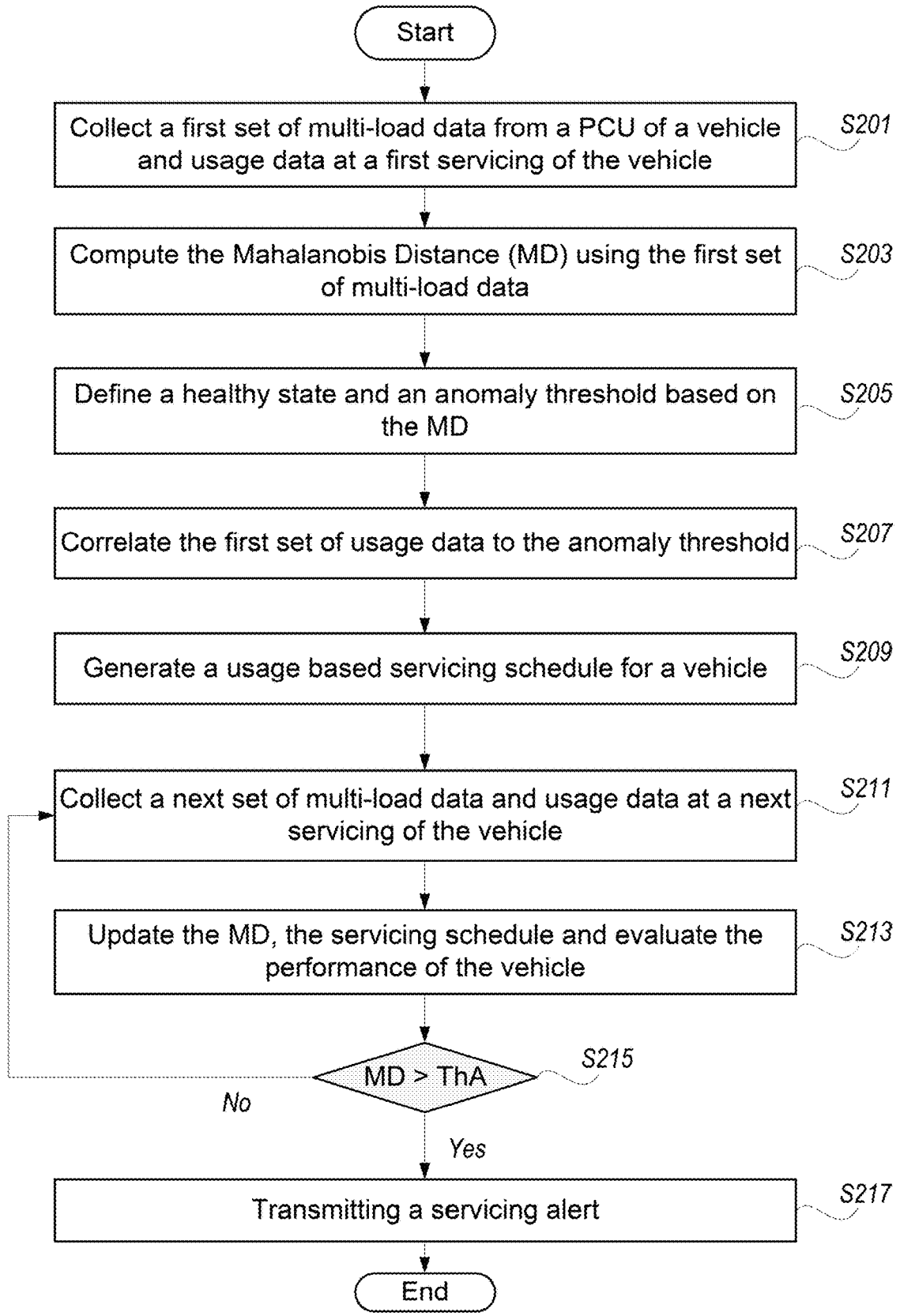
FIG. 2 is flow charts illustrating a method for servicing schedule of a vehicle according an embodiment of the present disclosure.

FIG. 2 represents a flow chart of a servicing scheduling method 100 implemented on the server 100 according to an embodiment of the present disclosure. The process starts when a vehicle (e.g., V1, V2, V3, or V4) is brought in at the service station 110 for servicing, maintenance or repair.

In step S201, the server 100 collects a first set of multi-load data from the PCU of one or more vehicles, as well as a first set of usage data at a first servicing of the one or more vehicles and stores the collected data in an MD database. For example, the multi-load data can include data related to temperature, power, and vibration. The first servicing refers to a first maintenance schedule defined at a particular number of miles (e.g., approximately 5000 miles) or a duration (e.g., approximately 6 months) after purchase of a vehicle. Usage data characterizes a usage of the vehicle before the first servicing of the vehicle. The usage data can include, for example, a frequency of use, mileage, geographic location, wear, environment, etc. Furthermore, the usage data can be used to define a usage trend or pattern. For example, the user may drive 10 miles during a workday to and from working via one or more routes, e.g., a first route, and/or a second route. The first route and the second route can include different environmental and driving conditions; hence the vehicle can have different performance on each route.

Figure 4:
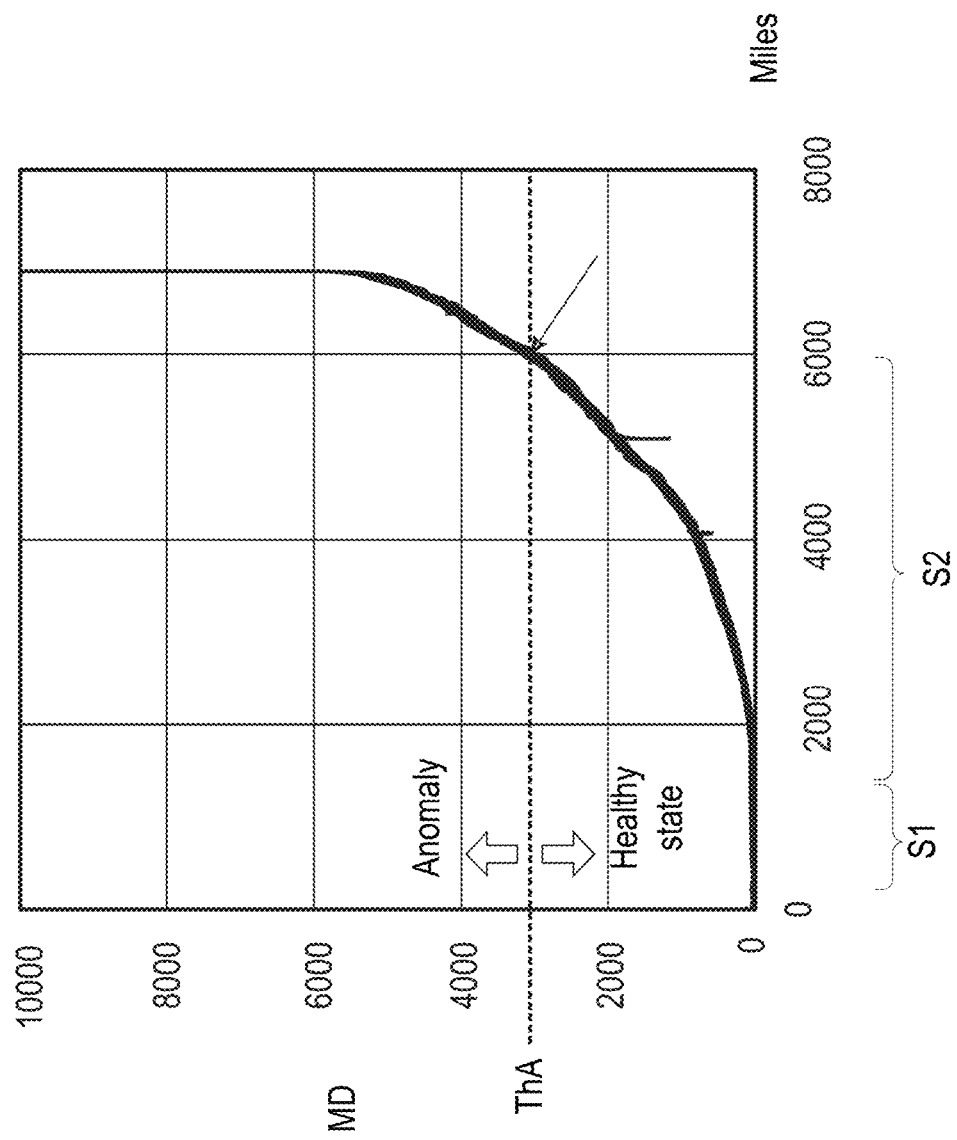
FIG. 4 illustrates an example Mahalanobis Distance computed in method of FIG. 2 according to an embodiment of the present disclosure.

In step S203, the server 100 computes MD using the first set of multi-load data from one or more vehicles. An example of MD is illustrated in FIG. 4. In FIG. 4, MD is computed using the first set of multi-load data collected over a first servicing period S1 as shown. Furthermore, the MD can be computed and/or updated using the multi-load data related to subsequent servicing such as a second servicing period S2.

Based on the computed MD, in step S205, the server 100 defines a healthy state and an anomaly threshold. Broadly, the healthy state can be defined as a statistical distribution having a mean $\mu$ and standard deviation $\sigma$ determined from the first set of multi-load PCU data. The anomaly threshold can be an upper bound that is approximately three standard deviations away from the mean $\mu$ (i.e., the anomaly threshold is approximately $\mu+3\sigma$). For example, in FIG. 4, the anomaly threshold ThA can be defined at an MD of 3000 units. A healthy state can be an MD value less than the ThA, for example, less than 3000 units.

In step S207, the server 100 correlates the first set of usage data to the anomaly threshold ThA. Such as a correlation allows the server 100 to determine whether a different usage of the vehicle may lead to different performance or degradation of any components, etc. In addition, usage data for more than one vehicle (e.g., V1, V2, V3, V4, etc.) serviced at a different location is received by the server 100. As such, the correlation between the usage data and the anomaly threshold allows for prediction of component degradation of a vehicle (e.g., V1) in a one location based on the usage data of a different vehicle (e.g., V2) in a second location.

In step S209, the server 100 uses the relationship between the usage data and the anomaly threshold ThA to generate a usage based servicing model. Such a usage based servicing model can predict degradation more accurately. The server 100 can determine whether a change in usage causes degradation of a particular component in similar other vehicles. For example, if the vehicle (e.g., V1) usage changes from 10 miles per day in good environmental conditions to 50 miles per day in relatively bad environmental conditions, then such a change in usage may cause early component degradation. Such degradation prediction can be confirmed by comparing MD of a different vehicle (e.g., V2) with similar usage. As such, the usage data can be an important indicator for change in servicing schedule of the vehicle (e.g., V1).

In step S211, the server 100 collects and stores a next set (e.g., a second set, a third set, etc.) of multi-load data and usage data at a next servicing (e.g., a second set, a third set, etc.) of the one or more vehicles (e.g., V1, V2, V3, V4, etc.).

In step S213, the server 100 can update MD, servicing schedule and evaluate the performance of a vehicle based on the next set of data. For example, in the second set of multi-load data and usage data, the vehicle (e.g., V1) may indicate a change in usage, load requirement, environmental conditions, etc. that may affect the performance of the vehicle or even cause early component degradation in the vehicle (e.g., V1). As such, updating MD based on a second set of data can help in improving the servicing schedule and the performance of the vehicle.

In step S215, at the next servicing (e.g., the second, the third, etc.), the server 100 determines whether MD has crossed the anomaly threshold ThA. When the anomaly threshold ThA is not crossed, the process continues to collect the multi-load data and usage data and update MD database. If the threshold ThA is crossed, the server 100 can determine an alert signal, via a network, indicating a change in servicing schedule or a message to bring in the vehicle for servicing, in step S217.

A conventional approach based on MD reduces multivariate data to univariate data. The MD is sensitive to changes between various parameters monitored as the MD takes the correlation between the different parameters into account. However, a complication arises in utilizing the conventional approach, as the "healthy" data set must be identified a priori in order to calculate MD and subsequently identify anomalous data based on a 3σ variation.

According to the present disclosure, the servicing schedule process assumes that upon the first vehicle servicing every vehicle is considered "healthy." Thus, when the vehicle is brought in for service the first time, the multi-load (temperature, power, vibration, etc.) data from PCU is transferred to a server, where the "healthy" state MD is calculated for that specific vehicle. As such, a "healthy" state is based on real data as opposed to test data. Furthermore, usage data from different vehicles at different locations is correlated to the anomaly detection threshold allowing prediction of degradation in an accurate manner. Additionally, just in time supply of part replacement or additional specialized servicing may be anticipated based on the trend data collected using the present servicing schedule process.

The present method can be applied to similar make or model vehicles driven by humans, or automated swarms of robots including autonomous road vehicles, air vehicles, or construction vehicles, etc.

Figure 5:
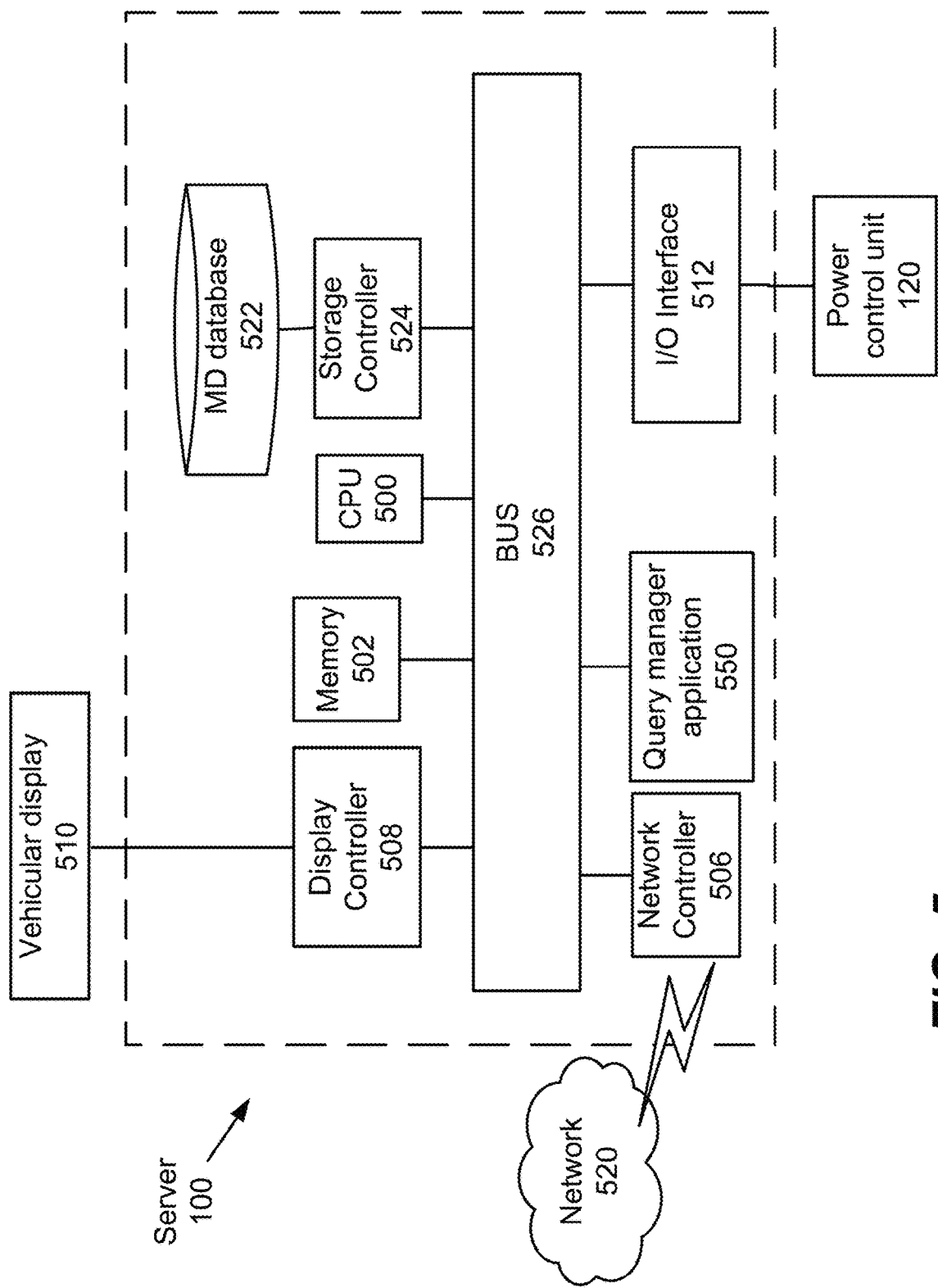
FIG. 5 is a detailed block diagram illustrating an exemplary server according to an embodiment of the present disclosure.

FIG. 5 is a detailed block diagram illustrating an exemplary server 100 according to certain embodiments of the present disclosure. In FIG. 5, the server 100 includes a CPU 500, the MD database 522, and a query manager application 550. In one embodiment, the MD database 552 can be an external component connected via a network 520. The server 100 can be connected to a power control unit (PCU) 120 of the vehicle via an I/O interface 512. In one embodiment, PCU 120 can be connected via the network 520.

The CPU 500 performs the processes described in the present disclosure. The process data and instructions may be stored in a memory 502. These processes and instructions (discussed with respect to FIG. 2) may also be stored on a storage medium disk 504 such as a hard drive (HDD) or portable storage medium or may be stored remotely. Further, the claimed advancements may be provided as a utility application, background daemon, or component of an operating system, or combination thereof, executing in conjunction with CPU 500 and an operating system such as Microsoft Windows or other versions, UNIX, Solaris, LINUX, Apple MAC-OS and other systems known to those skilled in the art.

The hardware elements in order to achieve the server 100 may be realized by various circuitry elements, known to those skilled in the art. For example, CPU 500 may be a Xenon or Core processor from Intel of America or an Opteron processor from AMD of America, or may be other processor types that would be recognized by one of ordinary skill in the art.

The server 100 in FIG. 5, also includes the network controller 506, such as an Intel Ethernet PRO network interface card from Intel Corporation of America, for interfacing with a network 520. As can be appreciated, the network 520 can be a public network, such as the Internet, or a private network such as an LAN or WAN network, or any combination thereof and can also include PSTN or ISDN sub-networks. The network 520 can also be wired, such as an Ethernet network, or can be wireless such as a cellular network including EDGE, 3G and 4G wireless cellular systems. The wireless network can also be WiFi, Bluetooth, or any other wireless form of communication that is known. The server 100 can communicate with external devices such as the electronic device 101 such as the scanner 105, the fax 110 and the camera 115, etc. via the network controller 520.

The server 100 further includes a display controller 508, such as a NVIDIA GeForce GTX or Quadro graphics adaptor from NVIDIA Corporation of America for interfacing with vehicular display 510. An I/O interface 512 interfaces with a keyboard and/or mouse 514 as well as a touch screen panel 516 on or separate from vehicular display 510. The queries to the server 100 can be handled by the query manager application 550 including extracting data from the MD database 400 via the storage controller 524, or trigger execution of processes discussed in FIG. 2.

The storage controller 524 connects the storage mediums with communication bus 526, which may be an ISA, EISA, VESA, PCI, or similar, for interconnecting all of the components of the server 100. A description of the general features and functionality of the vehicular display 510, keyboard and/or mouse 514, as well as the display controller 508, storage controller 524, network controller 506, and the I/O interface 512 is omitted herein for brevity as these features are known.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and subcombinations are intended to fall within the scope of this disclosure.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosure. The accompanying claims and their equivalents are intended to cover such forms or modifications as would fall within the scope and spirit of the present disclosure. For example, this technology may be structured for cloud computing whereby a single function is shared and processed in collaboration among a plurality of apparatuses via a network.

What is claimed is:

1. A method for generating a servicing schedule of an electrified vehicle, the method comprising:
collecting, via processing circuitry, (1) values from a plurality of sensors of the electrified vehicle corresponding to at least three of a temperature, a vibration, a power, a voltage, and a current of a power control unit including at least one of an AC/DC converter, a Voltage-Boosting Converter, an inverter, a power module, a capacitor, and an inductor as a first set of multi-load data and (2) a first set of usage data at a first servicing of the electrified vehicle;
computing, via the processing circuitry, a Mahalanobis Distance (MD) using the first set of multi-load data;
defining, via the processing circuitry, a healthy state and an anomaly threshold based on the MD;
correlating, via the processing circuitry, the first set of usage data to the anomaly threshold;
generating, via the processing circuitry, a usage based servicing schedule for the vehicle based upon the correlating;
collecting, via the processing circuitry, a next set of multi-load data and a next set of usage data at a next servicing of the vehicle;
updating, via the processing circuitry, the MD and the servicing schedule and evaluating a performance of the vehicle based upon the next set of multi-load data and the usage data at the next servicing of the vehicle;
determining, via the processing circuitry, whether the updated MD crosses the anomaly threshold; and
transmitting, via a network, a servicing alert indicating that the power control unit of the electrified vehicle is in need of servicing upon the updated MD exceeding the anomaly threshold to the vehicle.

2. The method of claim 1, further comprising defining, via the processing circuitry, the healthy state as a statistical distribution having a mean and a standard deviation computed from first sets of multi-load data of more than one vehicle at the first servicing.

3. The method of claim 2, further comprising defining, via the processing circuitry, the anomaly threshold as three standard deviations away from the mean.

4. The method of claim 1, further comprising collecting, via the processing circuitry, values from the plurality of sensor corresponding to all of the temperature, the vibration, the power, the voltage, and the current of the power control unit of the one or more vehicle as the multi-load data.

5. The method of claim 1, wherein the usage data includes a usage of the vehicle based on parameters including a frequency of use, mileage, geographic location, environment, or wear.

6. The method of claim 1, wherein the usage data includes a usage of the vehicle based on parameters including a frequency of use, mileage, geographic location, environment, and wear.

7. The method of claim 1, further comprising assuming, via the processing circuitry, that the first set of multi-load data represents the healthy state when computing the MD.

8. The method of claim 1, further comprising measuring, via the plurality of sensors, the at least three of the temperature, the vibration, the power, the voltage, and the current of the power control unit.

9. A system for generating a servicing schedule of an electrified vehicle, the system comprising:
one or more vehicle including an electric vehicle or a hybrid vehicle including
a power control unit including at least one of an AC/DC converter, a Voltage-Boosting Converter, an inverter, a power module, a capacitor, and an inductor, and
a plurality of sensors configured to measure at least three of a temperature, a vibration, a power, a voltage, and a current of the power control unit; and
processing circuitry configured to
(1) values from the plurality of sensors corresponding to the at least three of the temperature, the vibration, the power, the voltage, and the current of the power control unit of the one or more vehicle as a first set of multi-load data and (2) a first set of usage data of the one or more vehicle at a first servicing at one or more service stations,
compute a Mahalanobis Distance (MD) using the first set of multi-load data,
define a healthy state and an anomaly threshold based on the MD,
correlate the first set of usage data to the anomaly threshold,
generate a usage based servicing schedule for the one or more vehicles serviced at the one or more service stations based upon the correlating,
collect a next set of multi-load data and a next set of usage data at a next servicing of the one or more vehicles,
update the MD and the servicing schedule and evaluate a performance of the one or more vehicles based upon the next set of multi-load data and the next set of usage data at the next servicing of the vehicle,
determine whether the updated MD crosses the anomaly threshold, and
transmit, via a network, a servicing alert indicating that the power control unit of the one or more vehicle is in need of servicing upon the updated MD exceeding the anomaly threshold to the one or more vehicles.

10. The system of claim 9, wherein the processing circuitry is configured to define the healthy state as a statistical distribution having a mean and a standard deviation computed from first sets of multi-load data of more than one vehicle at the first servicing.

11. The system of claim 10, wherein the processing circuitry is configured to define the anomaly threshold as three standard deviations away from the mean.

12. The system of claim 9, wherein
the plurality sensor are configured to measure all of the temperature, the vibration, the power, the voltage, and the current of the power control unit of the one or more vehicle, and
the processing circuitry is configured to collect values from the plurality of sensor corresponding to all of the temperature, the vibration, the power, the voltage, and the current of the power control unit of the one or more vehicle as the multi-load data.

13. The system of claim 9, wherein the usage data includes a usage of the vehicle based on parameters including a frequency of use, mileage, geographic location, environment, or wear.

14. The system of claim 9, wherein the usage data includes a usage of the vehicle based on parameters including a frequency of use, mileage, geographic location, environment, and wear.

15. The system of claim 9, wherein the processing circuitry is configured to assume that the first set of multi-load data represents the healthy state when computing the MD.

16. A non-transitory computer-readable medium storing instructions which when executed by a computer, cause the computer to perform a method generating a servicing schedule of an electrified vehicle, the method comprising:

collecting (1) values from a plurality of sensors of the electrified vehicle corresponding to at least three of a temperature, a vibration, a power, a voltage, and a current of a power control unit including at least one of an AC/DC converter, a Voltage-Boosting Converter, an inverter, a power module, a capacitor, and an inductor as a first set of multi-load and (2) a first set of usage data at a first servicing of the electrified vehicle;

computing a Mahalanobis Distance (MD) using the first set of multi-load data;

defining a healthy state and an anomaly threshold based on the MD;

correlating the first set of usage data to the anomaly threshold;

generating a usage based servicing schedule for the vehicle based upon the correlating;

collecting a next set of multi-load data and a next set of usage data at a next servicing of the vehicle;

updating the MD and the servicing schedule and evaluating a performance of the vehicle based upon the next set of multi-load data and the usage data at the next servicing of the vehicle;

determining whether the updated MD crosses the anomaly threshold; and transmitting, via a network, a servicing alert indicating that the power control unit of the electrified vehicle is in need of servicing upon the updated MD exceeding the anomaly threshold to the vehicle.

\* \* \* \* \*